United States Patent Office 3,636,092
Patented Jan. 18, 1972

3,636,092
PRODUCTION OF 2,4,5-TRICHLOROBENZOIC ACID
Heinz Nohe, Ludwigshafen, Germany, assignor to Badische Anilin- & Soda-Fabrik AG, Ludwigshafen (Rhine), Germany
No Drawing. Filed Dec. 3, 1969, Ser. No. 881,934
Claims priority, application Germany, Dec. 6, 1968, P 18 13 013.7
Int. Cl. C07c 63/12
U.S. Cl. 260—515 A
8 Claims

ABSTRACT OF THE DISCLOSURE

The production of 2,4,5-trichlorobenzoic acid by heating a 3,4,5,6 - tetrachlorocyclohexadiene-1,2-dicarboxylic acid or a mixture thereof in an aqueous medium and in the presence or absence of basic reagents, or in an organic solvent in the presence of basic reagents at temperatures of from 30° to 300° C.

---

The present invention relates to a new process for the production of 2,4,5-trichlorobenzoic acid.

It is already known from Chemical Abstracts, volume 56 (1962), 10,049a that 2,4,5-trichlorobenzoic acid may be prepared by chlorination of benzyl alcohol in sulfuric acid in the presence of iodine. In this method, however, a mixture of 2,4,5-trichlorobenzoic acid and 2,3,6-trichlorobenzoic acid is obtained from which 2,4,5-trichlorobenzoic acid has to be isolated by means of an expensive separation process.

It is also known that 2,4,5-trichlorobenzoic acid may be prepared by oxidation of 2,4,5-trichlorotoluene with chromic acid or nitric acid. The 2,4,5-trichlorotoluene used as starting material for this method is, however, not easily accessible (cf. Chemical Abstracts, volume 64 (1966), 6560c).

We have now found that 2,4,5-trichlorobenzoic acid can be prepared in a simple manner by heating one of the isomers of 3,4,5,6-tetrachlorocyclohexadiene - 1,2 - dicarboxylic acids, or a mixture of such isomers, in an aqueous medium, or in an organic solvent in the presence of basic reagents at temperatures of from 30° to 300° C.

2,4,5-trichlorobenzoic acid is obtained in excellent yields and in high purity by the process according to the invention. Surprisingly, other isomers of trichlorobenzoic acid and other by-products are not formed. The 3,4,5,6-tetrachlorocyclohexadiene-1,2-dicarboxylic acids to be used as starting materials are obtained in good yields for example by partial electrochemical hydrogenation of tetrachlorophthalic acid or the anhydride thereof. The starting material thus obtained is probably a mixture of 3,4,5,6-tetrachlorocyclohexa - 3,5 - diene-1,2-dicarboxylic acid and 3,4,5,6-tetrachlorocyclohexa-2,6-diene-1,2-dicarboxylic acid in the ratio of about 1:1. The other isomers of 3,4,5,6-tetrachlorocyclohexadiene-1,2-dicarboxylic acid or mixtures thereof may, however, also be used as starting materials, because the isomeric form, from which the end product results, evidently develops under the reaction conditions.

Water itself is preferably used as the aqueous medium. Mixtures of water and organic solvents (preferably soluble in water) such as alcohols, ketones, ethers and amides may, however, also be used. Lower alkanols, e.g. those having 1 to 3 carbon atoms, dialkyl-ketones, e.g. those having 1 to 4 carbon atoms in each alkyl, cyclic ethers having 5 or 6 ring members and 1 or 2 ether groups in the ring, amides of lower alkanoic acids, e.g. those having 1 to 3 carbon atoms, N-allyl- and N,N-diallylsubstituted amides of lower alkanoic acids, e.g. those having 1 to 3 carbon atoms in the alkanoic group and 1 to 3 carbon atoms in each allyl substituent, N-allyl substituted cyclic carboxylic amides having 5 or 6 ring members, or pyrrolidones and piperidones are preferred. Examples of suitable solvents are methanol, isopropanol, acetone, dioxane, tetrahydrofuran, methyl glycol, dimethylformamide, N-methylpyrrolidone. It is preferred to use mixtures of water and organic solvents in which the content of water is at least 1% by weight and particularly at least 10% by weight. Surprisingly, the reaction in an aqueous medium is substantially independent of the pH of the medium. The reaction may therefore be carried out with good results in water alone or in aqueous acids such as aqueous hydrochloric acid, sulfuric acid or phosphoric acid, for example at acid concentrations of 0.5 to 80% by weight, or in aqueous solutions of basic reagents. Examples of suitable basic reagents are: hydroxides, oxides, alcoholates, carbonates of the alkali metals and alkaline earth metals, alkali metal salts of lower carboxylic acids, ammonia, ammonium hydroxide and amines. Specific examples are: calcium, sodium, potassium and lithium hydroxide, sodium carbonate, potassium carbonate, sodium methylate, potassium acetate, aniline, triethylamine, pyridine and quinoline.

If the reaction is carried out in a non-aqueous organic solvent, the use of basic reagents is necessary. The basic agents listed above may for example be used.

Polar solvents in particular may be used, for example alcohols, ketones, amides, nitriles, aromatic and aliphatic nitrated or halogenated hydrocarbons. Specific examples are as follows: methanol, ethanol, isobutanol, ethyl glycol, N-butyl glycol, methyl ethyl ketone, acetonitrile, N-methylpyrrolidone, dimethylformamide, chlorobenzene and nitrobenzene.

If the basic substances are liquids, they may be used at the same time as solvents. This is possible for example when using amines. If the basic reagents are present in solid form during the reaction, it is advantageous to use them in particulate form.

When the basic reagents are not used simultaneously as solvents, they are usually used in an amount of from about 1 to 30%, preferably 2 to 20%, by weight with reference to the starting material.

The ratio by weight of solvent or aqueous solvent to starting material is generally from 5:1 to 200:1, preferably from 30:1 to 100:1.

The process is carried out at temperatures of from 30° to 300° C., preferably from 50° to 150° C. Atmospheric pressure is generally used. Superatmospheric pressure may, however, also be used, for example when the boiling point of the solvent is lower than the reaction temperature, or subatmospheric pressure may be used, for example 500 mm. The reaction generally takes from six minutes to twenty-four hours, depending on the reaction temperature and the reaction medium used.

The process may be carried out for example by introducing the starting material gradually into the aqueous medium or into the mixture of the basic reagent and the solvent at the reaction temperature. If water or an aqueous solvent is used, the trichlorobenzoic acid formed is usually precipitated during the reaction. In this case the whole is cooled and the trichlorobenzoic acid is filtered off, washed with water and dried. If the reaction is carried out in a basic reaction medium, it is advantageous to set up an acid pH in the reaction mixture after the reaction is over. The trichlorobenzoic acid is then if desired precipitated by adding water and filtered off or obtained by distilling off the solvent.

2,4,5-trichlorobenzoic acid is an important intermediate for the production of herbicides and pesticides.

The following examples illustrate the invention.

EXAMPLE 1

1500 ml. of water is heated to boiling point in a two-liter three-necked flask fitted with a reflux condenser and a stirrer. While stirring, 20 g. of a mixture of isomeric 3,4,5,6-tetrachlorocyclohexadiene-1,2-dicarboxylic acids is introduced. The first crystals are precipitated after one hour. After reaction for four hours at 100° C., the reaction mixture is cooled and the precipitate formed is filtered off, washed with water and dried. A second fraction of crystals is obtained by concentrating the filtrate in vacuo to one-tenth of its volume. 14.5 g. (98.6% of the theory) of 2,4,5-trichlorobenzoic acid is obtained having a melting point of from 162° to 163° C.

EXAMPLE 2

40 g. of ethylenediamine and 10 g. of a mixture of isomeric 3,4,5,6 - tetrachlorocyclohexadiene-1,2-dicarboxylic acids are heatd for three hours at 115° C. and then cooled. 100 ml. of water is subsequently added to the solution which is acidified with 120 ml. of 30% by weight hydrochloric acid, the trichlorobenzoic acid being precipitated. The precipitate is filtered off, washed with water and dried. 7.1 g. (95.3% of the theory) of 2,4,5-trichlorobenzoic acid having a melting point of from 161° to 162° C. is obtained.

EXAMPLE 3

20 g. of a mixture of isomeric 3,4,5,6-tetrachlorocyclohexadiene-1,2-dicarboxylic acids and 13 g. of sodium methylate are heated under reflux in 150 g. of anhydrous methanol for twenty-four hours. The solvent is then distilled off. About 50 g. of 20% by weight hydrochloric acid is added to the residue; the insoluble fraction is suction filtered, washed with water and dried. 14.55 g. (99% of the theory) of 2,4,5-trichlorobenzoic acid is obtained having a melting point of 160° to 162° C.

I claim:

1. A process for the production of 2,4,5-trichlorobenzoic acids wherein one of the isomers of 3,4,5,6-tetrachlorocyclohexadiene-1,2-dicarboxylic acids or a mixture thereof is heated to a temperature of from 30° to 300° C. in an aqueous medium or in an organic solvent in the presence of a basic reagent.

2. A process as claimed in claim 1 wherein the reaction is carried out in water.

3. A process as claimed in claim 1 wherein the solvent is a mixture of an organic solvent and at least 1% by weight of water.

4. A process as claimed in claim 1 wherein the basic reagent is used in an amount of from about 1 to 30% by weight with reference to starting material.

5. A process as claimed in claim 4 wherein the said percentage is 2 to 20%.

6. A process claimed in claim 1 wherein the ratio by weight of solvent or aqueous solvent to starting material is from 5:1 to 200:1.

7. A process as claimed in claim 6 wherein the said ratio by weight is from 30:1 to 100:1.

8. A process as claimed in claim 1 carried out at a temperature of from 50° to 150° C.

References Cited

Wagner et al.: Synthetic Organic Chem. (1953), Wiley & Sons, N.Y., p. 418.

JAMES A. PATTEN, Primary Examiner